United States Patent [19]

Hockley et al.

[11] Patent Number: 5,046,793
[45] Date of Patent: Sep. 10, 1991

[54] CHROMATICALLY CORRECTED DIRECTIONAL DIFFUSING SCREEN

[75] Inventors: Bernard S. Hockley, Georgetown; Romauld Pawluczyk, Bramalea, both of Canada

[73] Assignee: Litton Systems, Inc., Beverly Hills, Calif.

[21] Appl. No.: 357,119

[22] Filed: May 26, 1989

[51] Int. Cl.$^5$ .............................................. G03H 1/20
[52] U.S. Cl. ........................................ 359/12; 359/15; 359/28; 359/599
[58] Field of Search ................... 350/3.61, 3.66, 3.69, 350/3.7, 3.77, 3.81, 3.86, 431

[56] References Cited

U.S. PATENT DOCUMENTS

| | | | |
|---|---|---|---|
| 3,708,217 | 1/1973 | McMahon | 350/3.86 |
| 3,758,186 | 9/1973 | Brumm | 350/3.69 |
| 4,372,639 | 2/1983 | Johnson | 350/3.7 |
| 4,586,780 | 5/1986 | Chern et al. | 350/3.7 |
| 4,586,781 | 5/1986 | Gunther et al. | 350/3.7 |
| 4,602,843 | 7/1986 | Glaser-Inbari | 350/3.7 |
| 4,610,499 | 9/1986 | Chern et al. | 350/3.7 |

OTHER PUBLICATIONS

"Holographic and Interferometric Viewing Screens by Meyerhofer", Applied Optics, vol. 12, No. 9, Sep. 1973, pp. 2180–2184.

"Development of a High-Gain, Golographic Grating Projection Screen," by Umstatter & Trolinger, SPIE, vol. 676, Ultraprecision Machining & Automated Fabrication of Optics (1986) pp. 17–23.

Primary Examiner—Paul M. Dzierzynski
Assistant Examiner—J. P. Ryan
Attorney, Agent, or Firm—Lynn & Lynn

[57] ABSTRACT

A holographic diffuser provides a high degree of chromatic correction, or color balance, within a selected eyebox and the ability to generate more than one specific eyebox for multiple observer applications. The strength of these gratings can be varied to modify the diffraction efficiency for each color so that the balance of colors can be varied within the eyebox. This balancing of colors can be used, for example, to compensate for color imbalance within the light source or image generator. Illuminating a first holographic medium produces a first real image of a diffusing screen in a define eyebox. A second hologram is recorded in the holographic medium using the real image produced by the first hologram as an object such that when the holographic medium is illuminated, it produces a second real image of a diffusing screen in the define eyebox. A third hologram is recorded in the holographic medium using the second real image as an object. The third hologram is formed by multiple exposures of the holographic medium with a plurality of selected spectral components. The plurality of selected spectral components comprises optical wavelengths that may correspond to the colors red, green and blue, respectively. The third hologram may be formed by exposing the holographic medium with a single optical wavelength with first, second and third angles of incidence being selected for each exposure of the holographic medium to the optical wavelength.

16 Claims, 7 Drawing Sheets (Theoretical Case)

(Theoretical Case)

(Non-Holographic)

(Non-Holographic)

CHROMATICALLY CORRECTED DIRECTIONAL DIFFUSING SCREEN

BACKGROUND OF THE INVENTION

This invention relates generally to a chromatically corrected directional diffusing screen. This invention relates particularly to a diffusing screen that is generated by a holographic technique. Still more particularly this invention relates to a diffusing screen that directs chromatically balanced light into one or more specific eyeboxes, or exit pupils, such that the screen appears to have an enhanced and uniform brightness when viewed from each eyebox.

Optical diffusers are used for improving the light uniformity in illuminating systems and for producing a directional redistribution of incident light so that an image projected on a screen may be observed from different directions. In display devices both aspects of diffusers are important since the illumination uniformity and image brightness for the required observation directions are important.

Generally, if a diffuser is illuminated with approximately collimated incident light, it transforms incident beams into a light pattern with a given angular distribution. A diffuser usually decreases the light brightness in the propagation direction while at the same time increasing the brightness for other directions. Nevertheless, it always produces lower brightness for directions different from propagation direction of illuminating beam. Therefore, application of a diffuser in a display system with side observation requires a very bright, high-power light source. In some cases, the available light is limited to the degree that it permits only poor performance of the display system. An improvement in diffuser characteristics therefore could play a very important role in increasing the quality of optical display systems.

Properties of diffusers may be described by three characteristics:

(1) Angular distribution of the diffused light when the diffuser is illuminated with a parallel beam,
(2) total light losses in the diffuser,
(3) for some applications, imaging properties.

These characteristics depend mainly on the physical structure and technology used in forming the diffuser. Existing diffusers may be categorized as being either volume diffusers or surface diffusers.

Volume diffusers are usually made from a transparent material which includes the light scattering centers or at least two surface diffusers set in tandem. The properties of volume diffusers strongly depend on the volume concentration of the scattering centers in the material and the thickness of the material in the first case. The properties of volume diffusers also depend on the scattering properties of particular components and distance between them.

Surface diffusers are usually made from a solid plate having a light scattering surface. Depending on the application, the substrate of the diffuser may be either transparent for transmitted light or either semitransparent or opaque for reflected light.

Fiber-optic and holographic diffusers have recently been developed. The fiber-optic diffuser redistributes the incident light by transmitting it through a short length of optical fiber. The holographic diffuser redistributes the incident light by diffraction.

The design of a diffuser depends on the application in which it will be used. Light losses are always important; therefore, nonabsorbing materials are used. If the object itself has strong diffusing properties, the most important factor is the uniformity of the illuminating light. Volume diffusers are generally preferred when uniformity of the light distribution is the most important design consideration. The imaging properties of the diffuser are directly related to its thickness. Therefore, thin volume or surface diffusers are generally preferred for imaging systems.

The performance of a display for viewing by an observer is limited by the brightness and resolution of the image as seen by a viewer in the viewing zone. In most cases from a selected point of view, the brightness of the image varies across the screen and depends on the viewer's position. The brightness of the screen is not the same over the entire screen area, and the distribution of the light depends on the viewer's position within the viewing zone. The distribution of the light on the screen may make it difficult for the viewer to observe all parts of the screen and reliably extract information therefrom. Therefore, it may be desirable to define a viewing pupil that receives the majority of light from the display.

Significant interest has been generated in the last few years in mechanisms that direct light in specific directions from the diffusing screens of display devices. Such mechanisms permit the available light to be used more efficiently by directing it specifically towards the observer so that the image appears brighter than with conventional screens. Directional diffusing screens providing better brightness uniformity across the screen from the selected point of view using holographic techniques were first discussed in the open literature by Meyerhofer, *Applied Optics*, Vol. 12, No. 9, pp 2180–2184, September 1973. U.S. Pat. No. 4,372,639 issued Feb. 8, 1983 to Johnson discloses a holographic diffusing screen and method of construction. The construction technique includes the use of large aperture conventional optics to image a real diffusing screen on to the hologram and also to form the eyebox, which is the exit pupil of the diffuser. The technique of Johnson is cumbersome and difficult to implement. The diffusing screen formed by this technique can be used only for monochromatic source applications. U.S. Pat. Nos. 4,586,780 and 4,586,781 disclose improvements by the use of a fiber-optic face plate to eliminate the zero order light from the holographic diffusing screen and to provide a rudimentary form of chromatic correction for some single directions.

SUMMARY OF THE INVENTION

The present invention provides significant advantages over the prior art in terms of the ability to provide a high degree of chromatic correction, or color balance, within the eyebox, the ability to generate more than one specific eyebox for multiple observer applications, and in the method of construction of the holographic diffuser by the use of a multiple stage holographic recording technique.

A primary feature of the invention is the generation of chromatic correction or balancing within the viewing eyebox by a multiple exposure technique during the construction of the final hologram or holograms, within the volume of the holographic emulsion that directs specific colors into the eyebox. Three colors are typically blue, green and red. The strength of these gratings can be varied to modify the diffraction efficiency for each color so that the balance of colors can be varied within the eyebox. This balancing of colors can be used, for example, to compensate for color imbalance within the light source or image generator.

Multiple eyeboxes chromatically balanced can be created by this holographic diffuser by additional exposure of the final hologram within another holographic configuration, defined as incoherent addition of holograms, or by using a holographic optical system that generates all the multiple eyeboxes at the same time, defined as coherent addition of holograms.

The multiple step holographic method uses a hologram, or holograms, to define one or more eyeboxes and hence the pupils of the diffuser which are back projected onto the final hologram. This technique enables the diffuser to be constructed to exactly match the optics of the final projector to create a highly efficient optical device.

A directional chromatically corrected light diffuser according to the present invention comprises a holographic medium. A first hologram is recorded in the holographic medium such that when the holographic medium is illuminated with a conjugated reference beam it produces a real image of a diffusing screen. Dimensions and position of a first hologram relatively to the diffuser define the dimensions and position of the eyebox for the first diffuser. A second hologram is recorded in the holographic medium using the real image produced by the first hologram as an object such that when the holographic medium is illuminated with the conjugated reference beam, it produces a second real image of a diffusing screen and real image of the first hologram as the defined eyebox. A third hologram is recorded in the holographic medium using the second real image as an object projected into the plane of the final hologram. The third hologram is formed by multiple exposures of the holographic medium with a plurality of selected spectral components. The plurality of selected spectral components comprise optical wavelengths may correspond to the colors red, green and blue, respectively.

The third hologram may be formed by exposing the holographic medium with a single optical wavelength with first, second and third angles of incidence being selected for each exposure of the holographic medium to the optical wavelength.

The method according to the invention for forming a directional chromatically corrected light diffuser comprises the steps of placing a diffusing screen at a selected location and recording a first hologram using the diffusing screen as an object. The first hologram is used to form a first real image of the diffusing screen and a second hologram is recorded using the first real image as an object. The second hologram is illuminated to form a second real image of the diffusing screen. The second real image of the diffusing screen is used as an object to record the third hologram.

The method of the invention may include the step of forming the third hologram by the steps of exposing the holographic medium with first, second and third selected spectral components. The method may also include the steps of selecting the first, second and third spectral components to correspond to the colors red, green and blue, respectively.

The method of the invention may include the steps of forming the third hologram by exposing the holographic medium with a single optical wavelength, and selecting first, second and third angles of incidence for each exposure of the holographic medium to the optical wavelength. The method may also include the step of adjusting the angles of incidence to form an exit pupil that is projected at a predetermine angle. The method may also include the step of adjusting the angles of incidence to project chromatically balanced light into a selected eyebox region.

The method preferably includes the step of illuminating the holographic medium with a diffuse reference beam to form the third hologram to improve the scattering characteristics of the undiffracted light transmitted through the hologram.

DESCRIPTION OF THE PREFERRED EMBODIMENT

Figure 1A:
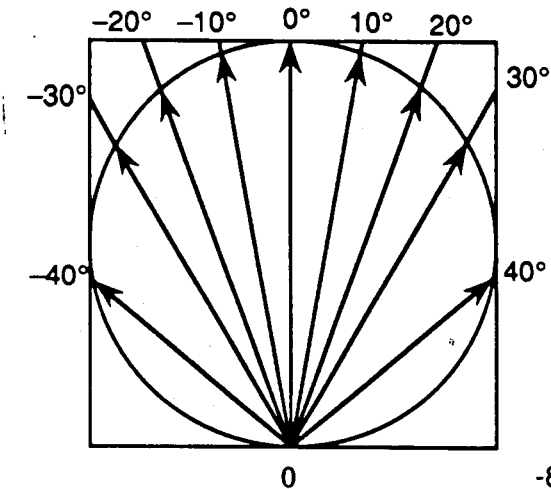
FIG. 1A is a polar coordinate representation of the angular distribution of light intensity for a Lambertian diffuser.
Figure 1B:
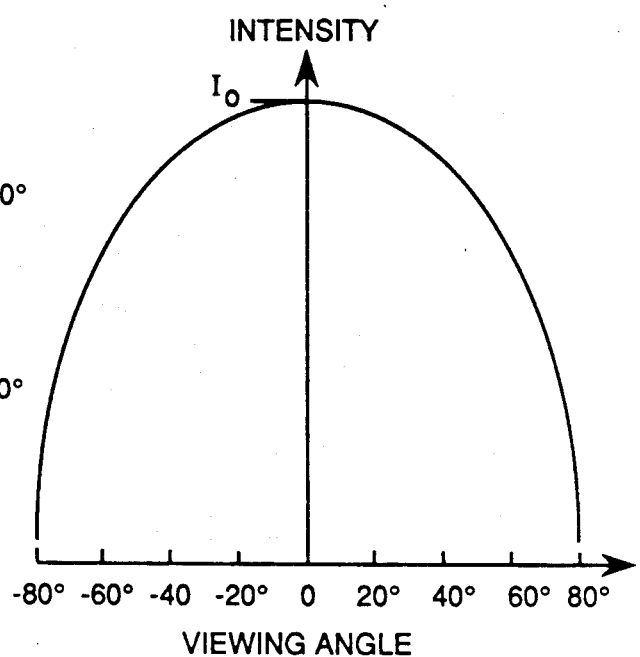
FIG. 1B is a Cartesian coordinate representation of the angular distribution of light intensity for the Lambertian diffuser of FIG. 1A.

An explanation of prior art diffusers will facilitate an understanding of the advantages and features of the present invention. The theoretically ideal diffuser is usually called a Lambertian diffuser. When a Lambertian diffuser is illuminated with a parallel light beam at normal incidence to the diffuser, it scatters the light with an angular intensity distribution described by the function $\cos \theta$, where $\theta$ is the angle between the normal to the diffuser surface and the observation direction. Referring to FIG. 1A, the normalized angular characteristic of a Lambertian diffuser is shown in polar coordinates. FIG. 1B shows the characteristic of a Lambertian diffuser in Cartesian coordinates. The length of the arrows in FIG. 1A represents the light intensity from the diffuser in the direction corresponding to the angle measured between the direction of the observation and normal to the diffuser surface.

From FIGS. 1A and 1B it can be seen that the light intensity decreases as the viewing angle increases. At the same time, however, the given surface is seen to become correspondingly smaller so that the light flux collected from some constant solid angle remains constant. For the observer such a diffuser appears to be equally bright independently of the observation direction. Since the Lambertian diffuser would send the light uniformly into all spaces, the amount of light detected for some chosen direction and limited solid angle is very small. A very strong light source would be required to obtain an acceptable brightness on a very large surface for a Lambertian diffuser.

Figure 2A:
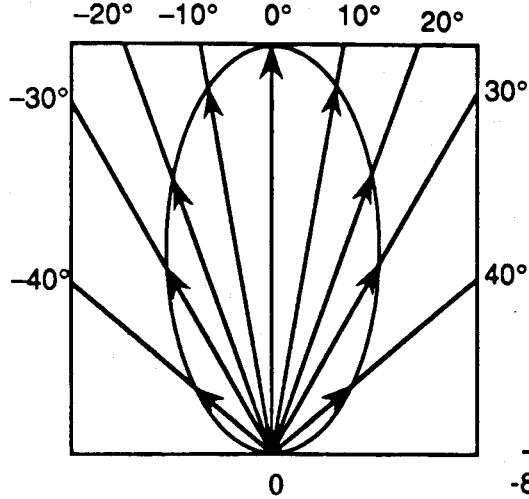
FIG. 2A is a polar coordinate representation of the angular distribution of light intensity for a non-Lambertian diffuser.
Figure 2B:
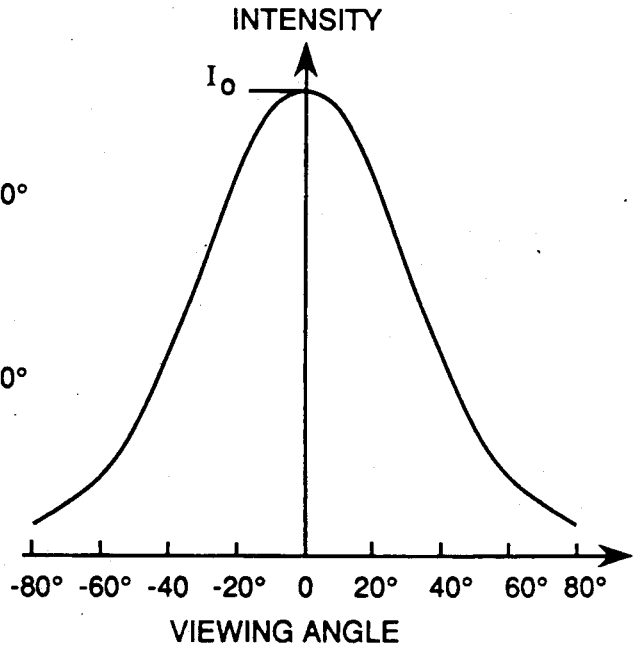
FIG. 2B is a Cartesian coordinate representation of the angular distribution of light intensity for the non-Lambertian diffuser of FIG. 2A.

Real diffusers never have such ideal characteristics. The normalized angular distribution of light intensity for a typical non-Lambertian diffuser is shown in FIGS. 2A and 2B. The lobe is elongated in the direction of propagation of the incident light.

Figure 3A:
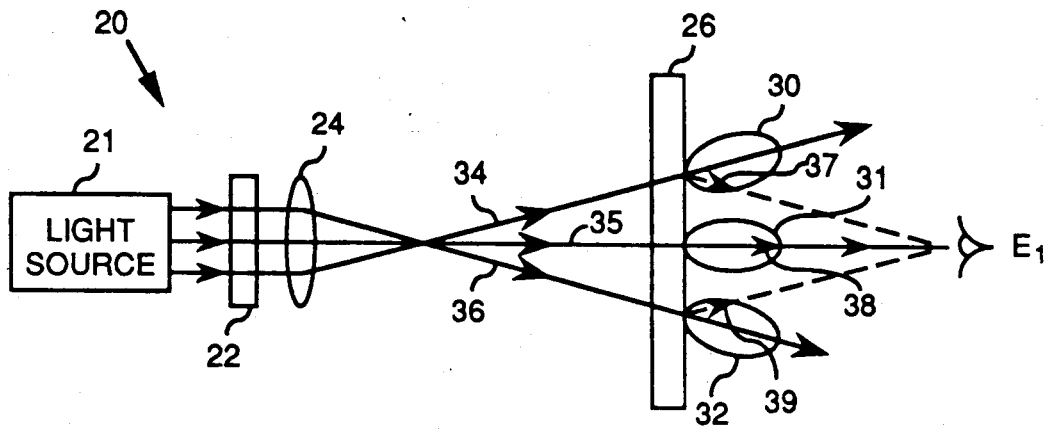
FIG. 3A illustrates on-axis operation of a standard diffusing screen.

FIG. 3A illustrates the light distribution from a standard diffuser of a type that may be used in a slide projector 20. The apparatus of FIG. 3A includes a light source 21, a slide 22, a focusing objective lens 24 and a diffuser 26. The observer is a point $E_1$ on the axis of the incident light. The light intensity distribution created by the diffuser for three locations on the diffuser is represented by the three lobes 30-32. In each case the maximum brightness is along the rays 34-36, which is shown by the long axes of the lobes 30-32, respectively. The lengths of the arrows 37-39 represent different amounts of light that reach the observer's eye from different points on the diffuser surface. The observer therefore sees a nonuniformity in brightness across the diffuser surface.

Figure 3B:
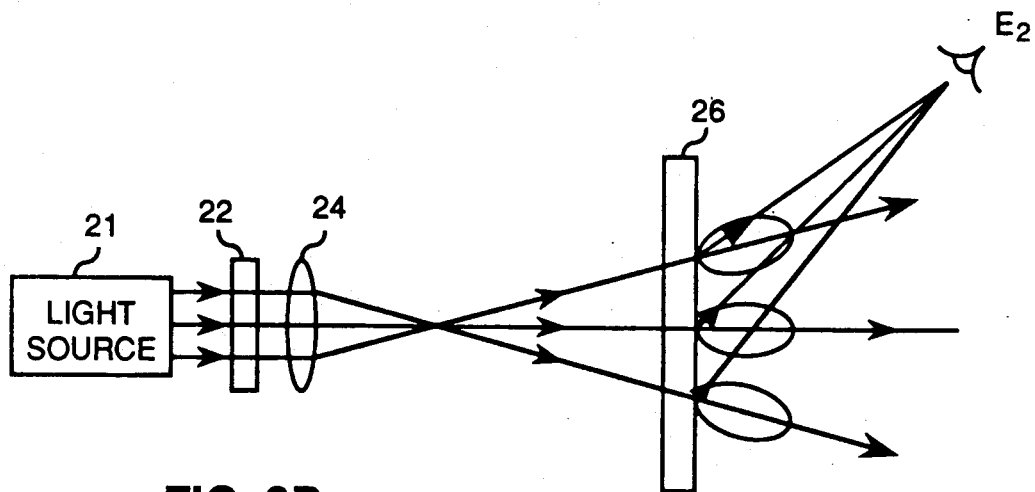
FIG. 3B illustrates off-axis operation of a standard diffusing screen of FIG. 3A.

FIG. 3B shows the same apparatus as FIG. 3A with the observer at a point $E_2$ spaced apart from the axis of the incident light. When the observer looks at the diffuser 26 at a location spaced away from the axis of the illuminating beam, the whole image on the diffuser surface is much darker than the image seen from an on-axis viewing point. In actual practice, the image on the diffuser 26 is often seen from some chosen off-axis direction. In such cases of off-axis viewing, the brightness of the image created on a real diffuser is very poor compared with that observed on the light axis.

Therefore in the case of the classical diffuser for off-axis observation there are two choices. One choice is an almost Lambertian diffuser that requires an intense light source and that spreads the light all over the space with good uniformity but with inefficient use of the available light. The other choice is a more directional diffuser that provides more efficient light utilization while providing worse uniformity in brightness for on-axis operation, lower image intensity and equally bad uniformity for off-axis observation.

Figure 4:
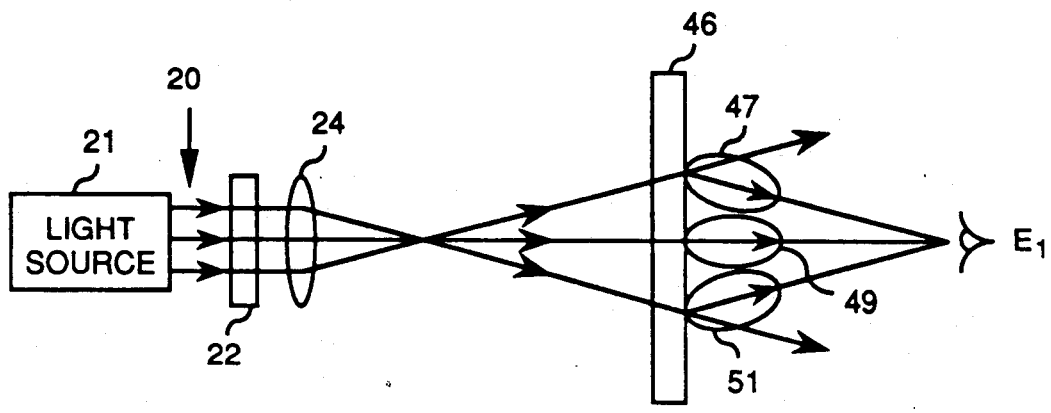
FIG. 4 illustrates on-axis operation of a directional diffusing screen.

An improved diffuser sends all the light into one or more dedicated eyeboxes and provides improved brightness uniformity over the whole surface of the eyebox. FIG. 4 shows on-axis operation in which a light beam 20 is incident on a slide 42. Light from the slide 22 passes through a projecting objective lens 24, which projects the slide image onto a diffuser 46. The observer is at the point $E_1$ on the axis of the incident light. The output of the diffuser 46 includes three lobes 47, 49 and 51. The diffuser 46 directs light onto only the viewer's eyebox to provide significant gain in image brightness, especially for on-axis observation. Meyerhofer, *Applied Optics*, Vol. 12, No. 9, pp 2180-2184, Sept. 1973, first demonstrated the advantages of holographic techniques to produce a diffuser having the characteristics of the diffuser 46 of FIG. 4.

Very careful estimates show that for off-axis operation with an angle of 30° between the direction of observation and the incident light, the directional diffuser may provide a brightness gain of one order of magnitude in comparison with a Lambertian diffuser. In comparison with real diffusers the gain may be significantly greater than one order of magnitude. Unfortunately, the technical feasibility of using standard random scattering techniques to form a diffuser with the required characteristics is strongly limited. The only improvement that can be achieved is the compression of the scattering lobe of the diffuser in such a way that more light is directed along the axis of the incident beam.

U.S. Pat. No. 4,372,639 to Johnson discloses holographic diffuser for off-axis applications and methods of construction as well. It requests however, very cumbersome techniques and additionally, final diffuser is burdened with chromaticity, which limits its applicability to monochrome systems only.

Figure 5:
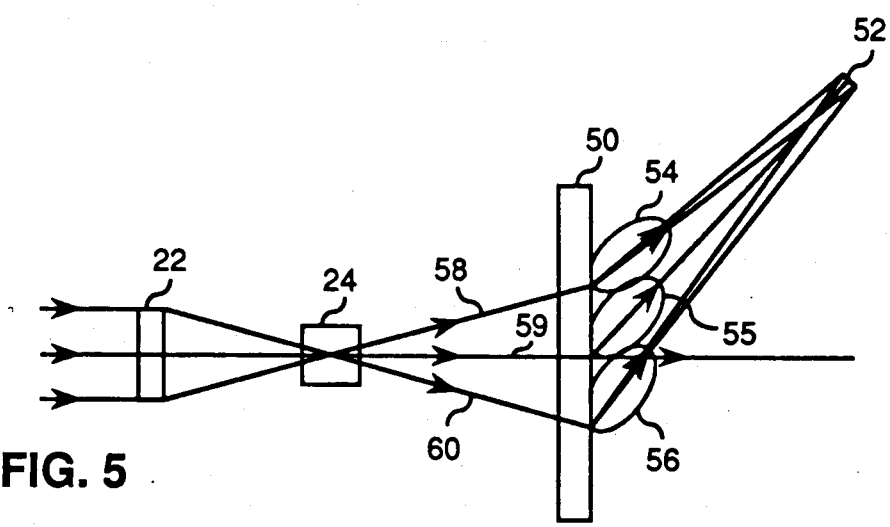
FIG. 5 schematically illustrates a diffuser according to the present invention.

FIG. 5 illustrates the characteristics of a diffuser 50 formed according to the present invention to concentrate a selected amount of the incident light into a dedicated eyebox 52 of limited dimensions and spaced apart from the axis of the light incident on the diffuser 50. The lens 24 directs light from the slide 22 to the diffuser 50. The lobes 54-56 illustrate the distribution of light transmitted by the diffuser 50. The lobes 54-56 correspond to incident rays 58-60 directed from the lens 24 to the diffuser 50. The diffuser 50 directs a selected portion of each incident ray toward the eyebox 52 so that the brightness over all the diffuser 50 may be essentially uniform.

Figure 6:
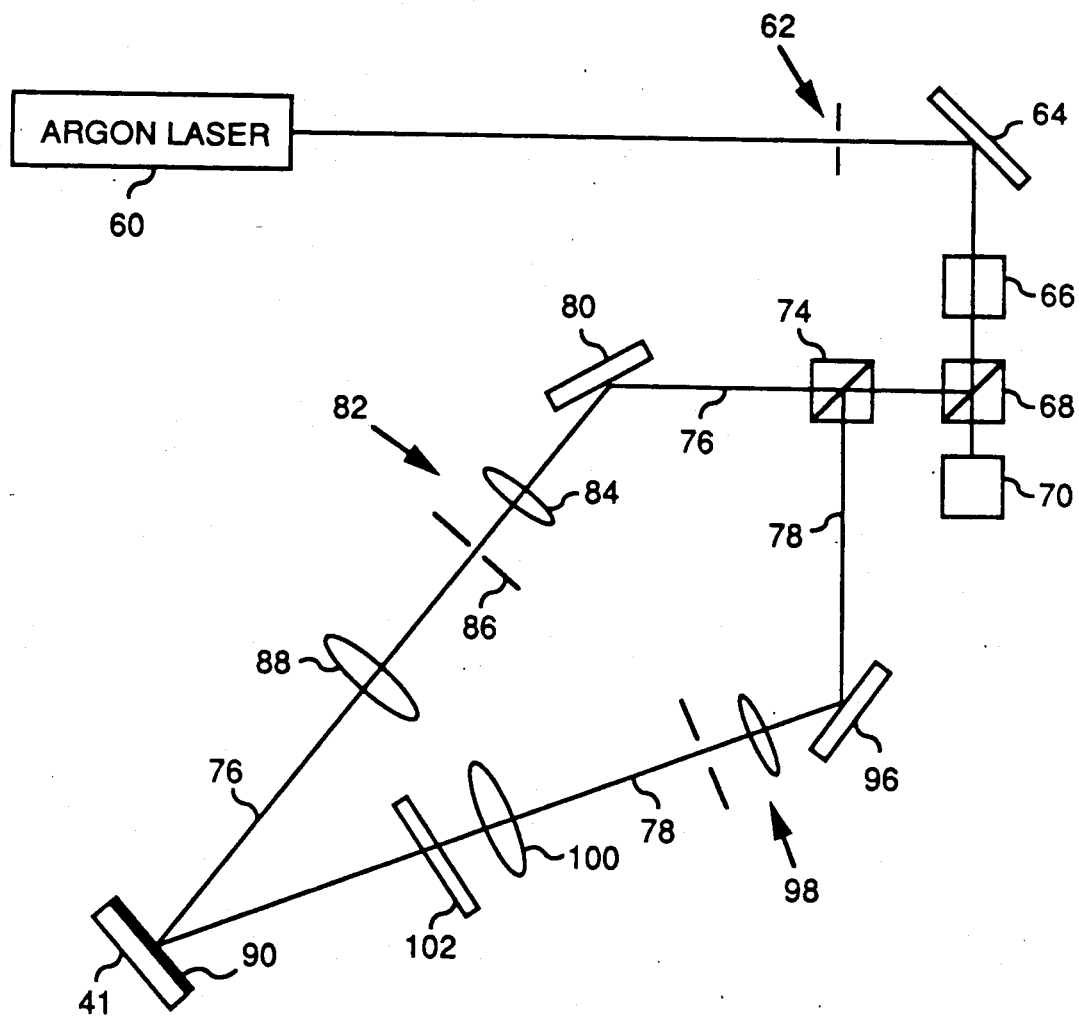
FIG. 6 schematically illustrates a first step that may be used to form the diffuser of FIG. 5.
Figure 7:
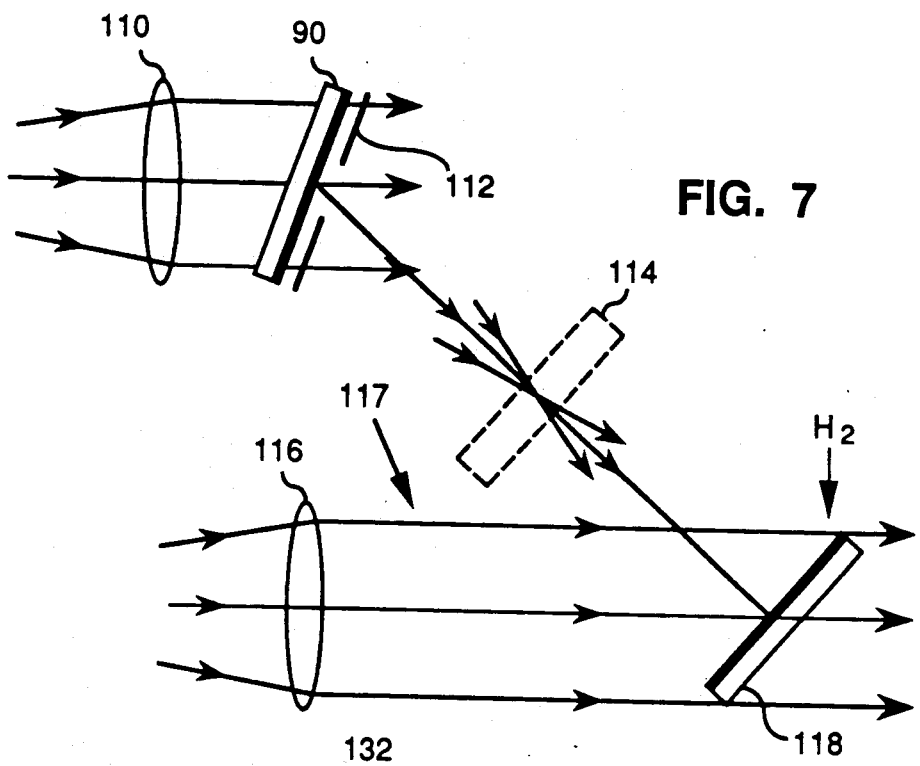
FIG. 7 schematically illustrates a second step that may be used to form the diffuser of FIG. 5.

The diffuser 50 may be formed by a three-step holographic process shown in FIGS. 6-8. Referring to FIG. 6, a laser 60, preferably an argon laser, produces a beam of light that passes through a shutter 62 before reaching a mirror 64. The mirror 64 directs the light reflected to a periscope system 66, which transmits the light to a variable attenuator 68. Part of the optical output of the variable attenuator 68 is absorbed by a power absorber 70. The rest of the output of the variable attenuator 68 is used to form a hologram 90. A variable beamsplitter 74 divides light from the variable attenuator 68 into a pair of light beams 76 and 78. The light beam 76 reflects from a mirror 80 to a spatial filter 82 that preferably is formed using a microscope objective lens 84 and a pinhole 86. The beam 76 then reaches a preferably collimating lens 88, and passes through it to a holographic plate 90 to form the primary hologram. The beam 78 reflects from a mirror 96 and then passes through a spatial filter 98 that is similar to the spatial filter 82. The beam 78 then reaches a second collimating lens 100, which directs the beam toward a primary diffuser 102. The diffuser 102 (for example a ground glass screen) is placed in the position of the required (final) screen. It is illuminated from the rear by laser radiation. The beam 78 passes through the primary diffuser 102 and then reaches the holographic plate 90. When the shutter 62 is open, the two beams form an interference pattern on the holographic plate 90. The holographic plate 90 used to record a first hologram $H_1$ is placed in the position of the desired eyebox. The plate 90 is also illuminated with a collimated laser beam to form the reference beam in the construction of the hologram $H_1$. The holographic plate 90 includes a photosensitive material that records and stores the interference pattern.

The variable attenuator 68 regulates the intensities of the beams 76 and 78. The variable attenuator 68 may be formed using a variable polarizing beamsplitter (not shown) or a semitransparent mirror with variable reflectivity (not shown); the variable beamsplitter divides the beam into two parts. The power absorber 70 absorbs 70 light transmitted by the beamsplitter. The variable beamsplitter 74 divides the incident beam into two parts having the intensity ratio required to form the hologram. The variable beamsplitter 74 also linearly polarizes the light beams to have directions of polarization suitable for hologram registration.

Referring to FIG. 7, a secondary hologram $H_2$ is formed in the holographic plate 118. A lens 110 directs a light beam conjugated to the reference beam 76 in FIG. 6 to the primary hologram 90, which is placed adjacent an aperture 112 that defines the eyebox 52. This light forms a real image 114 of the diffuser 102 previously registered in the holographic plate. A lens 116 directs a reference light beam to the holographic plate. This reference beam 117 interferes with the light creating the real image 114 of the diffuser 102 at the holographic plate 118 to register the secondary hologram $H_2$.

Figure 8B:
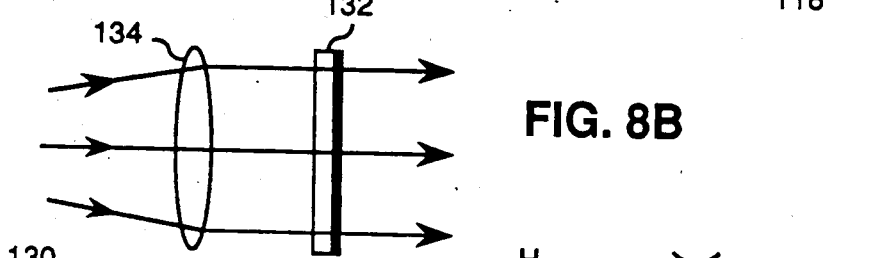
FIG. 8B illustrates the use of an auxiliary diffuser in performing the step illustrated in FIG. 8A.
Figure 8A:
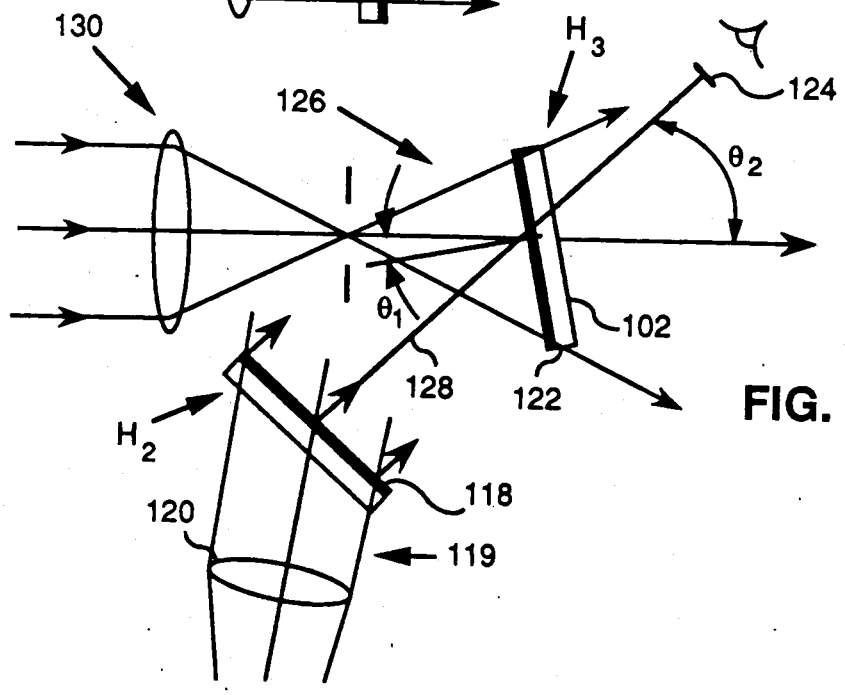
FIG. 8A schematically illustrates a third step that may be used to form the diffuser of FIG. 5.

FIG. 8A illustrates apparatus for creating a third hologram $H_3$ in the holographic plate 122. A lens 120 directs a beam of light 119 conjugated to the reference beam 117 in FIG. 7 to the secondary hologram $H_2$ to reconstruct the image 114 used in FIG. 6 to form the secondary hologram. The reconstructed image of the diffuser 102 forms on the holographic plate 122. A reference light beam passes through a spatial filter 130 and propagates toward the holographic plate at angle of incidence $\theta_1$. Light 128 from the secondary hologram 118 is incident upon the region of the holographic plate where the third hologram will be formed at an angle $\theta_2$.

The secondary hologram $H_2$ is reconstructed with beam 119 conjugated to the reference beam 117 in FIG. 7 to create the real image of the diffuser 102 and limited by aperture 112 in FIG. 7 the image of the first hologram $H_1$. Limited by aperture 112, the image 124 of the first hologram plays the role of the element defining the position and dimensions of the eyebox 52. The third hologram is registered with a divergent reference beam 126, which simulates the light beam created by the projector in FIG. 5. The recording geometry corresponds to the geometry of the projector of FIG. 5, which means that the third hologram $H_3$ functions as a directional diffuser, diffracting the incident light into the required direction.

Since a point reference source is used for construction, such a diffuser has a limited angular acceptance of the incident light. To increase the angular acceptance instead of a convergent beam created by pinhole the diffuse beam may be used. FIG. 8B shows an auxiliary diffuser 132 placed in the plane of pinhole of spatial filter 130. Diffuser 132 is illuminated by parallel or divergent beam suitably transformed with a lens 134. Dimensions and position of the diffuser 132 are selected in such a way that it is equivalent to the exit pupil of the objective 24 of the slide projector in FIG. 5

When an image is projected onto the diffuser 50 according to the present invention, part of the incident light is diffracted into the object beam direction, causing an increase in the image brightness for this specific direction. At the same time, since the object registered on the final hologram has a random structure, the hologram also acts as a conventional diffuser that has strong scattered components in the transmittance. The angular characteristics of such diffusers and typical glass nonholographic diffusers are shown in FIG. 9.

Figure 9:
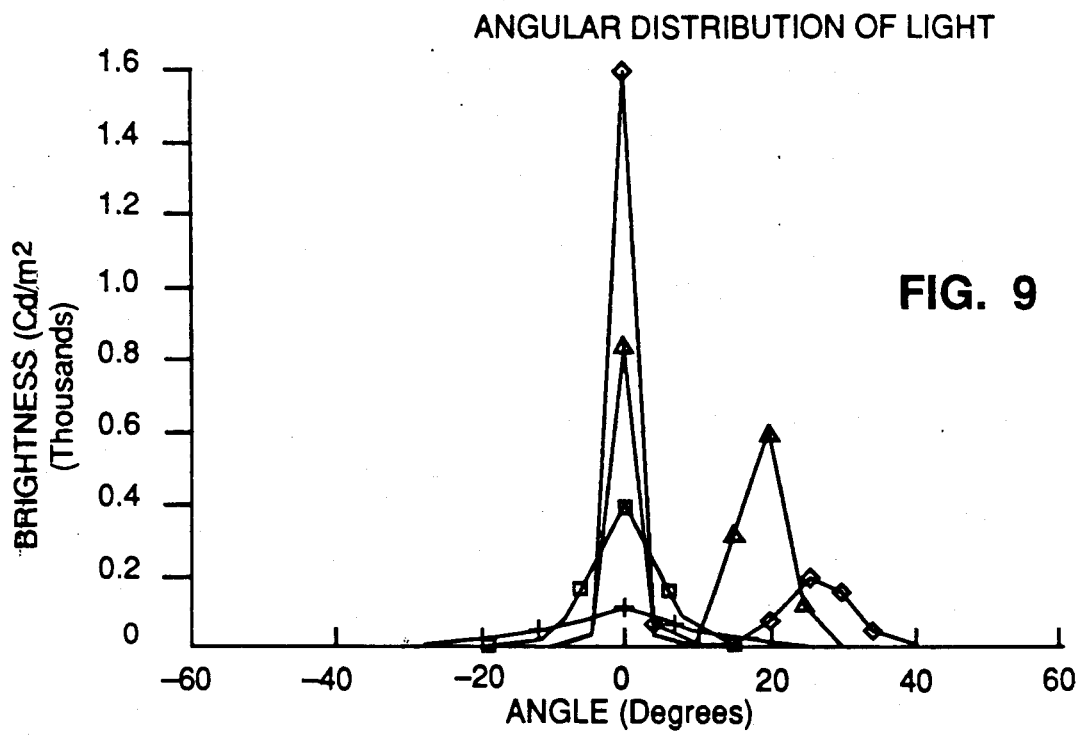
FIG. 9 graphically illustrates the brightness of various types of diffusers as functions of viewing angle.

In FIG. 9 the graph marked with squares represents the characteristics of a glass diffuser typically used in a photographic camera. The graph marked with crosses represents the simplest ground glass diffuser. The graphs marked with triangles and rhombuses represent the brightness distributions for holographic diffusers. The graphs show that holographic diffusers produced according to the present invention provide a very bright diffracted component in the selected direction. For one holographic diffuser the selected direction is about 20°, and for the other the selected direction is between 27° and 30°.

When such a holographic diffuser is illuminated, any point in the illuminated hologram diffracts light into the defined eyebox. The diffraction efficiency of the hologram depends upon the photosensitive material used to record the holograms. In dichromated gelatin the diffraction efficiency is greater than 60% can be achieved.

Some problems may arise in using holographic diffusers. The most important difficulty is a change in the chromaticity of the image caused by the angular dispersion of the hologram. This phenomenon is particularly strong for holographic diffusers with large diffraction angles and angularly small eyeboxes. The change in chromaticity is less pronounced for diffusers having large eyeboxes.

Figure 10:
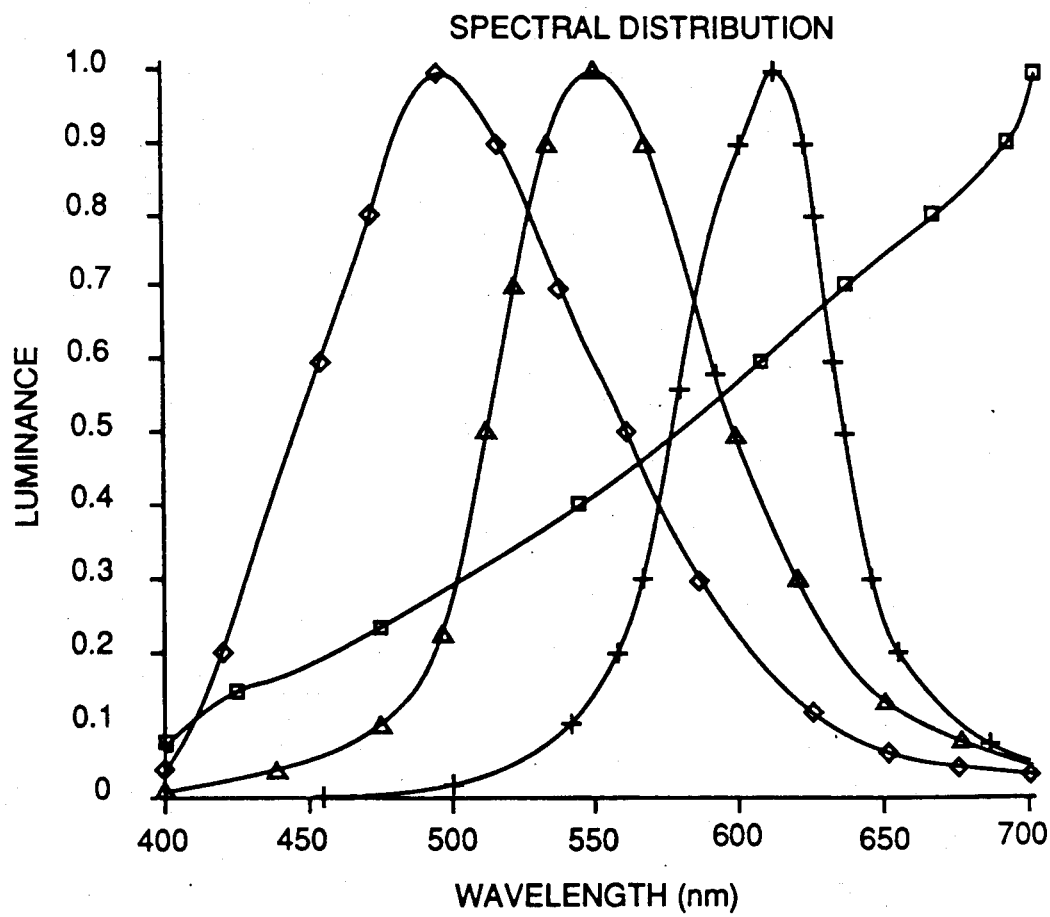
FIG. 10 graphically illustrates the normalized spectral brightness of holographic diffusers.

FIG. 10 shows the spectral brightness for three different holograms. The graph marked with crosses represents a holographic diffuser with a very narrow eyebox; the triangled graph depicts a diffuser with an eyebox wider than that of the first holographic diffuser. The third holographic diffuser marked with rhombuses has a narrow eyebox but has a diffuse reference beam. For comparison with the holographic diffusers the normalized spectral brightness of the applied source is also shown in FIG. 10 (graph marked with squares).

It is evident from comparison of the curves for the different holographic diffusers that increasing the size of the eyebox causes extension of the bandpass. Therefore, the holographic diffuser with a significantly large eyebox applied in a projector system with a reduced eyebox would provide an image with acceptable chromaticity. Unfortunately this arrangement reduces the total amount of light directed into the dedicated eyebox. In addition, there always exists some remaining chromaticity that may be unacceptable in some color projectors.

Although the image quality observed on the holographic diffuser is higher than the image for an ordinary diffuser, the holographic diffuser may have some granularity that reduces the image resolution. It has been discovered that using a diffuse, rather than the usual focused, reference beam, to form the final hologram reduces the granularity and provides other improvements in the performance of the holographic diffuser. The diffuse reference beam increases image resolution because a wider angular aperture of incident radiation is accepted by the third hologram.

It was discovered that holograms created with a point source reference beam have a relatively high intensity undiffracted component, which renders the holographic diffuser unsuitable for on-axis observations. If only off-axis observations are desired, then the on-axis intensity is unimportant. The diffused reference beam permits the creation of a holographic diffuser having an acceptable transmitted component, a good forward diffused component and a satisfactory component diffracted into the eyebox.

The method of the present invention includes steps for improving on-axis and imaging characteristics of diffuser by using a diffuse reference beam in the creation process of the final diffuser $H_3$. Referring to FIG. 8B, the system including spatial filter 130 may be substituted with diffuser 132 illuminated with an application auxiliary optical system 134. It reduces granularity of the final diffuser and increases resolution of image projected into such a diffuser. At the same time it reduces directly transmitted light increasing forward diffuse component without significant reduction of the diffuse component diffracted into selected eyeboxes.

Figure 11:
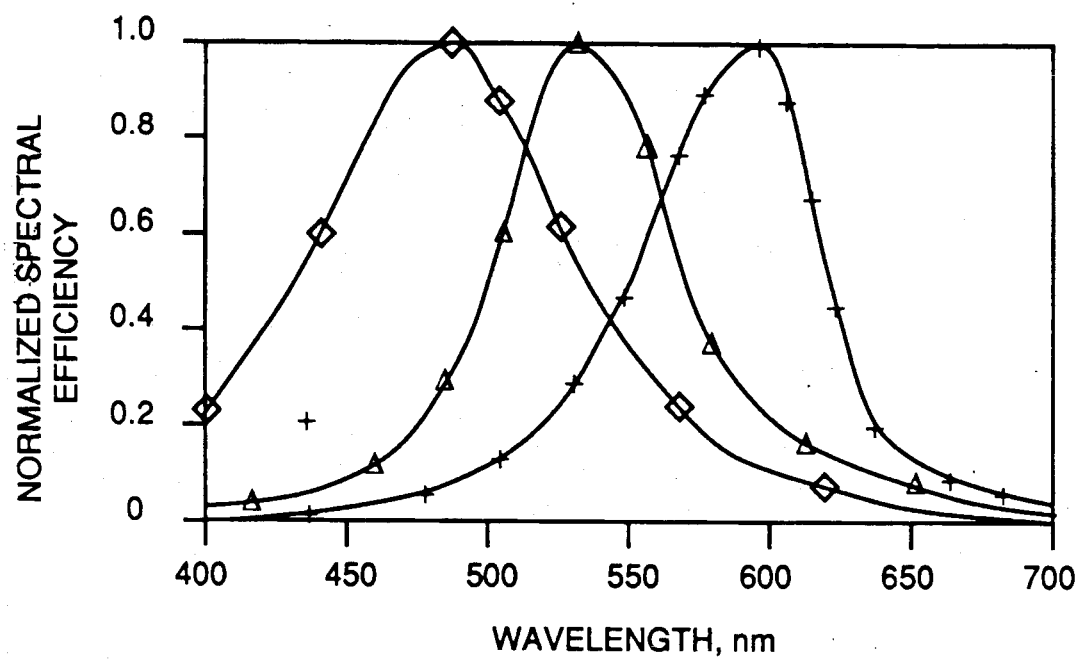
FIG. 11 graphically illustrates the dependence of the normalized spectral efficiency on wavelength for holographic diffusers at different observation directions.

The method of the present invention includes steps for eliminating the chromaticity described previously without significant eyebox extension. FIG. 11 shows the diffraction efficiency for three holographic diffusers made in different ways but measured under identical conditions. As shown in FIG. 11, the peak of diffraction efficiency and spectral bandpass of the light diffracted into the eyebox may be different for different holograms. It is known from the holographic practice that the position of diffraction efficiency peak for the same registration geometry depends on wavelength of light used for hologram creation or may be placed in different spectral areas by applying different registration geometry with the same wavelength of light used for hologram creation. On the other hand, spectral bandpass of diffracted light depends on the used holographic material (photosensitive layer) thickness, geometry of the holographic system used for final hologram creation and angular dimensions of sources both object and reference waves. In every case, however, bandpass is always limited, and, as a result, the spectral content of the light diffracted into the dedicated eyebox is different with that generated by the light source. For this reason such a diffuser can disturb or intentionally change the color of the final image.

It is well known that to obtain proper color relation three different components red, green and blue in proper relations are necessary. To achieve this, three different diffractive structures (one for each color component) having common eyebox for the same illuminated source for every eyebox are necessary. This is achieved by three exposures for every eyebox.

To secure the overlapping of all required spectral components in one eyebox two different ways can be used. The first way consists of the exposure of the final hologram in the same system with three different wavelengths corresponding to three required spectral components. It requires the holographic photographic materials to be sensitive in all the visible range of the spectrum.

The second solution consists of exposing the same material with one wavelength but in different holographic setup configurations. In FIG. 8A it corresponds to different angles $\theta_1$ and $\theta_2$. These angles are selected in such a way that for the same illumination conditions, the particular diffractive structures secure the Bragg conditions for different spectral components in a single eyebox. By making different exposures for the particular components it is possible to change the color balance in the final image. A diffuser produced according to the invention may be used for color correction of badly balanced images.

Generating and recording three or more different interference structures in the holographic screen by multiple exposure during recording of the third hologram solves the chromaticity problem. Because of the Bragg effect in the thick volume hologram, the red, blue and green gratings will diffract the individual colors into the selected eyebox to provide a uniform white light. The diffraction efficiency of each grating can be controlled to provide required color balance in the eyebox.

This invention proposes a more efficient method of providing chromatic uniformity over the design eyebox by generating three different diffraction gratings within the holographic screen by multiple exposure during the recording of $H_3$. It is possible to record the hologram by multiple exposures creating different gratings which diffract into one, or more, selected eyeboxes, required number of spectral components, for example: red, green and blue. Because of the narrow Bragg conditions of the thick volume hologram, on reconstruction, the individual colors will be diffracted by the respective gratings to direct the light into the design eyebox to provide a required, particularly uniform white light response. The diffraction efficiency of each of the individual gratings can be controlled by the construction process to enable the colors to be balanced within the eyebox. This may be required because of the illuminating source or color distribution of the image generator.

This invention can also be used to generate reflective diffusing screens by situating the reference source on the same side of the hologram as the eyebox during the construction of $H_3$. Thus $H_3$ becomes a reflection hologram.

The structures and processes illustrated and described herein illustrate the principles of the present invention. Modifications to the illustrated embodiments may be made without departing from the spirit of the present invention. Therefore the present invention includes the subject matter defined by the appended claims and all reasonable equivalents.

What is claimed is:

1. A method for forming a directional chromatically corrected light diffuser, comprising the steps of:
    placing a diffusing screen at a selected location;
    recording a first hologram on a first holographic medium using the diffusing screen as an object;
    illuminating the first hologram to form a first real image of the diffusing screen at a defined eyebox;
    recording a second hologram on a second holographic medium using the real image as an object;
    illuminating the second hologram to form a second real image of the diffusing screen; and
    recording a third hologram on a third holographic medium using the real image reconstructed from the second hologram as an object by a process that includes the steps of:
    exposing the third holographic medium with a first selected spectral component;
    exposing the third holographic medium with a second selected spectral component; and
    exposing the third holographic medium with a third selected spectral component.

2. The method of claim 1 including the steps of selecting the first, second and third spectral components to correspond to the colors red, green and blue, respectively.

3. A method for forming a directional chromatically corrected light diffuser, comprising the steps of:
placing a diffusing screen at a selected location;
recording a first hologram on a first holographic medium using the diffusing screen as an object;
illuminating the first hologram to form a first real image of the diffusing screen at a defined location;
recording a second hologram on a second holographic medium using the real image as an object; and
illuminating the second hologram to form a second real image of the diffusing screen; and
recording a third hologram on a third holographic medium using the real image reconstructed from the second hologram as an object and exposing the third holographic medium with a single optical wavelength and selecting first, second and third angles of incidence of both the object and reference beams for each exposure of the third holographic medium to the optical wavelength.

4. The method of claim 3 including the step of adjusting the angles of incidence for the reference and object beams to form an exit pupil that is projected into a selected eyebox region.

5. The method of claim 3 including the step of adjusting the angles of incidence for the reference and object beams to project chromatically balanced light into a selected eyebox region.

6. The method of claims 1 or 5 including repeating the exposure steps to produce multiple exit pupils at individually selected locations.

7. The method of claim 6 including the step of forming the first, second and third holograms to produce a reflective diffusing screen.

8. The method of claim 1, 2, 3, 4 or 5 including the step of forming the first, second and third holograms to produce a reflective diffusing screen.

9. A method for forming a directional chromatically corrected light diffuser, comprising the steps of:
placing a diffusing screen at a selected location;
recording a first hologram on a first holographic medium using the diffusing screen as an object;
illuminating the first hologram to form a first real image of the diffusing screen at a defined location;
recording a second hologram on a second holographic medium using the real image as an object;
illuminating the second hologram to form a second real image of the diffusing screen; and
recording a third hologram on a third holographic medium using the real image reconstructed from the second hologram as an object and illuminating the holographic medium with a diffuse reference beam.

10. A directional chromatically corrected light diffuser, formed by steps comprising:
providing a first holographic medium;
recording a first hologram in the first holographic medium such that when the holographic medium is illuminated with a light beam conjugated to reference, it produces a first real image of a diffusing screen;
recording a second hologram in a second holographic medium using the real image produced by the first hologram as an object such that when the second holographic medium is illuminated, it produces a second real image of a diffusing screen at a selected location defined by the area and position of the first hologram during exposure; and
recording a third hologram in a third holographic medium using the real image reconstructed from the second hologram as an object and by multiple exposures of the third holographic medium with a plurality of selected spectral components.

11. The directional chromatically corrected light diffuser of claim 10 including the step of selecting the plurality of spectral components to comprise optical wavelengths corresponding to the colors red, green and blue, respectively.

12. The directional chromatically corrected light diffuser of claim 10 including the step of forming the third hologram is by exposing the third holographic medium with a single optical wavelength with first, second and third angles of incidence being selected for each exposure of the holographic medium to the optical wavelength.

13. The directional chromatically corrected light diffuser of claim 10, 11 or 12 including the step of illuminating the third hologram to produce images of a diffusing screen at a plurality of individually selected locations.

14. The directional chromatically corrected light diffuser of claim 13 wherein the third hologram is constructed to produce a reflective diffusing screen.

15. The directional chromatically corrected light diffuser of claim 11 or 12 wherein the third hologram is constructed to produce a reflective diffusing screen.

16. A directional chromatically corrected light diffuser, formed by steps comprising:
providing a first holographic medium;
recording a first hologram in the first holographic medium such that when the first holographic medium is illuminated with a light beam conjugated to reference, it produces a first real image of a diffusing screen;
recording a second hologram in a second holographic medium using the real image produced by the first hologram as an object such that when the second holographic medium is illuminated, it produces a second real image of a diffusing screen at a selected location defined by the area and position of the first hologram during exposure; and
recording a third hologram in a third holographic medium using the real image reconstructed from the second hologram as an object to form a reflective hologram.

* * * * *